(12) United States Patent
Koehler et al.

(10) Patent No.: US 8,812,137 B2
(45) Date of Patent: Aug. 19, 2014

(54) CONTROLLING SENSOR NETWORKS

(75) Inventors: Michael Koehler, Hamburg (DE);
Markus Hugger, Rottweil (DE);
Dietmar Krause, Filderstadt (DE)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/536,256

(22) Filed: Jun. 28, 2012

(65) Prior Publication Data

US 2012/0271548 A1 Oct. 25, 2012

Related U.S. Application Data

(63) Continuation of application No. 12/037,446, filed on Feb. 26, 2008, now Pat. No. 8,239,046.

(30) Foreign Application Priority Data

Feb. 26, 2007 (EP) .................................... 07103034

(51) Int. Cl.
*G05B 11/01* (2006.01)

(52) U.S. Cl.
USPC ................. 700/19; 700/20; 700/24; 370/254; 702/104

(58) Field of Classification Search
USPC ................. 700/19, 20, 24, 32; 340/10.1, 10.4
See application file for complete search history.

(56) References Cited

U.S. PATENT DOCUMENTS

| | | |
|---|---|---|
| 2006/0190458 A1* | 8/2006 | Mishina et al. ................. 707/10 |
| 2007/0099623 A1 | 5/2007 | Stephensen et al. |
| 2007/0210916 A1 | 9/2007 | Ogushi et al. |
| 2007/0239569 A1 | 10/2007 | Lucas et al. |
| 2008/0180223 A1 | 7/2008 | Cato et al. |
| 2009/0212918 A1 | 8/2009 | Bandy et al. |
| 2009/0222541 A1* | 9/2009 | Monga et al. ................. 709/222 |

OTHER PUBLICATIONS

Liang et al., "Sensor Web and Geoswift—An Open Geospatial Sensing Service", GeoICT Lab, Department of Earth and Space Science and Engineering, Toronto, Canada, 2004.
Chu, "Open Sensor Web Architecture: Core Services", Grid Computing and Distributed Systems Laboratory, Department of Computer Science and Software Engineering, The University of Melbourne, Australia, Dec. 2005, pp. 1-45.
U.S. Office Action dated Jun. 16, 2010 received in the parent application, U.S. Appl. No. 12/037,446.
U.S. Final Office Action dated Nov. 24, 2010 received in the parent application, U.S. Appl. No. 12/037,446.
U.S. Office Action dated Aug. 9, 2011 received in the parent application, U.S. Appl. No. 12/037,446.
U.S. Final Office Action dated Jan. 20, 2012 received in the parent application, U.S. Appl. No. 12/037,446.
U.S. Notice of Allowance dated Mar. 30, 2012 received in the parent application, U.S. Appl. No. 12/037,446.

* cited by examiner

*Primary Examiner* — Mohammad Ali
*Assistant Examiner* — Nathan Laughlin
(74) *Attorney, Agent, or Firm* — Scully, Scott, Murphy & Presser, P.C.; David Adour, Esq.

(57) ABSTRACT

A control element for a sensor network having a set of different sensors. In operation, the control element transfers connections between the control element and the set of different sensors, where the transfer connections are compliant with respective sensor-specific protocols. A sensor controller element is provided for each sensor, and establishes transfer connections between the control element and new sensors in runtime. Information obtained in a sensor-specific protocol format from the sensors is converted into a common format in the sensor controller elements. The common format information is processed by a set of common control components of the control element. The control element provides a service based on the information in the common format to at least one consumer, and updates the service in accordance with the sensors present in the sensor network.

18 Claims, 12 Drawing Sheets

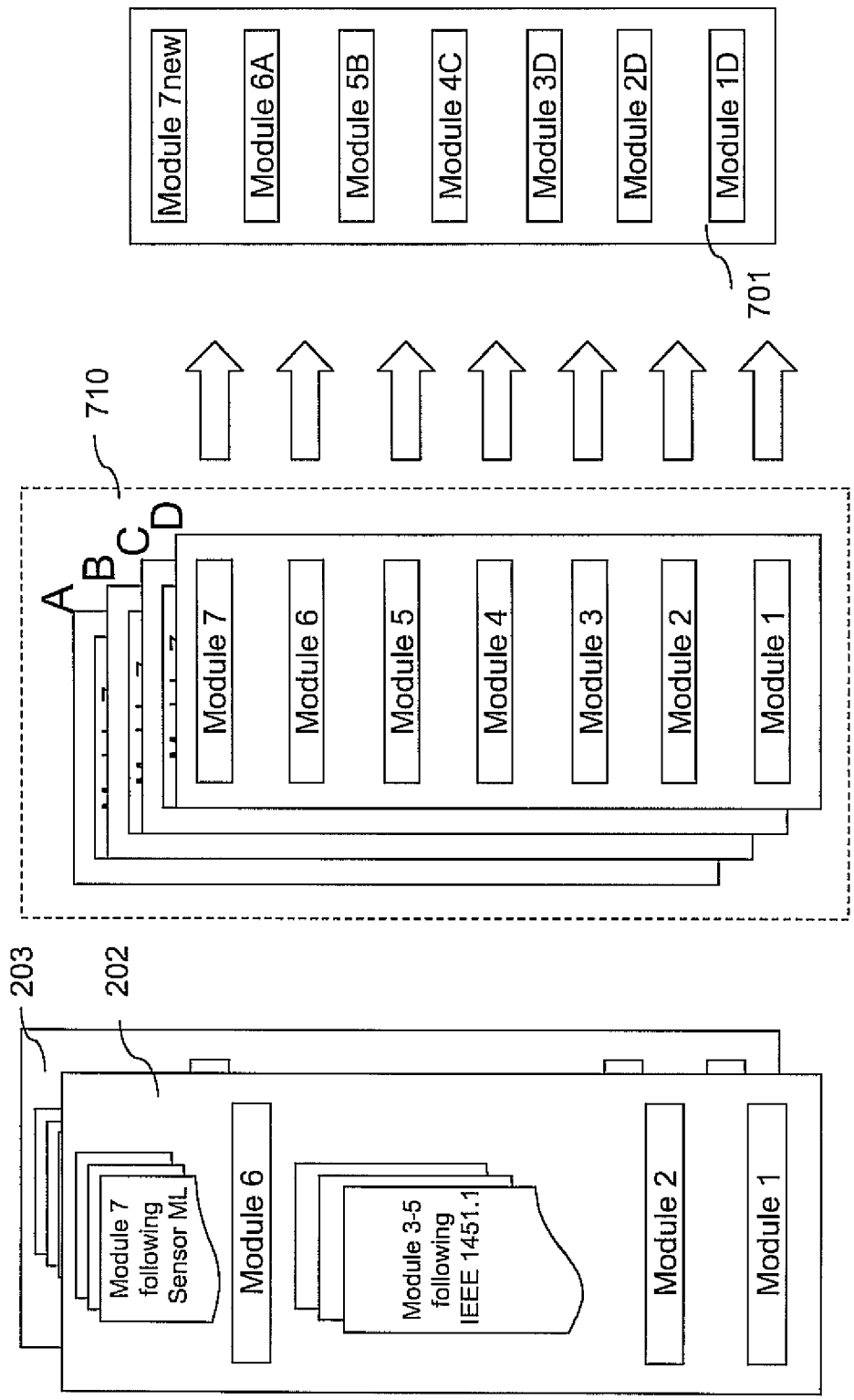

CONTROLLING SENSOR NETWORKS

CROSS REFERENCE TO RELATED APPLICATION

This application is a continuation of U.S. patent application Ser. No. 12/037,446, filed Feb. 26, 2008 the entire content and disclosure of which is incorporated herein by reference.

BACKGROUND OF THE INVENTION

1. Field of the Invention

The present invention relates in general to sensor networks. In particular, but not exclusively, the present invention relates to controlling communication between a set of different sensors and an application that processes sensor information.

2. Description of the Prior Art

Currently, the importance of sensors network is increasing strongly. A substantial information gain is expected by the linkage of different locations and/or different physical or geographical measured values. The following are some examples: By combining different aspect angles within the optical sensor technology one receives additionally spatial information and distances; by combining ambient temperature information and measurement of infrared radiation of objects, it is possible to have better identification capabilities; and, by combined local measurement of waving or temperature distributions one can project waves or temperature gradients more exactly.

Frequently sensors of different organizations or different manufacturers for different measured variables and accuracies are available. The problem, however, is that sensors' interconnection to an application is not standardized. Sensors and applications are often interoperable only with large preparation expenses.

Low-priced mass sensors and precision sensors would offer—interoperability presupposed—completely new possibilities for the illustration of the physical reality in information systems. By scattering small, low-priced sensors over large spatial ranges and by seizing data at critical points, monitoring of various environments would be possible. The following are examples of primary areas of such applications: warning and protection from natural catastrophes; military purposes; public security; warning and protection from environmental pollution; goods and passenger transportation; "intelligent" environments (ubiquitous computing); and telematic and geospatial intended purposes.

The current methods for the development of sensor network applications focuses primarily on writing custom applications. These custom applications are constrained by sensor/actuator-specific hardware and/or software technologies. This custom application approach is a sufficient one for closed homogeneous small-to-medium sized sensor networks. In large sized and/or heterogeneous and/or open/variable networks, where multiple types of sensor and actuator hardware and software may be integrated and re-integrated under a single enterprise wide application, this custom application approach is, however, inflexible and highly costly. It brings interface trouble in the development and lengthens the time to market.

Some current initiatives envision that overall application development for sensor networks will be such that application developers will be concerned only about the essence of their application rather than about the infrastructure nuances of sensor networks. One example thereof is the Open Sensor Web Architecture (OSWA). All these initiatives assume either that there exists a standard for sensor cross-linking or that it is possible by means of special middleware to cross-link all sensors. The latter assumption usually means the use of an instance of the specific middleware on the sensor system itself. Currently, there is no widely accepted or used middleware available for sensors. The establishment of industry-wide standards would certainly play a central role in materializing the benefits of sensor networks, but it will take time before any of the proposed standards will be widely deployed. An overall standard for all kinds of sensors will probably not be enforceable. While standards and a common middleware may be adopted in some areas some day, sensor network application development will continue to follow its current costly path, if no alternative emerge in the short run.

There is thus need for an alternative solution for providing sensor networks including different types of sensors.

SUMMARY OF THE INVENTION

A first aspect of the invention provides a computerised method for operating a control element for a sensor network including a set of different sensors, said method comprising the steps of:

controlling transfer connections between said control element and said set of different sensors, said transfer connections being compliant with respective sensor-specific protocols;

providing a sensor controller for each sensor of said set of different sensors in said control element;

establishing transfer connections between said control element and new sensors in runtime;

converting information obtained in a sensor-specific protocol format from said sensors into a common format in said sensor controllers;

processing said information in said common format by a set of common control components of said control element;

providing a service based on said information in said common format to at least one consumer; and updating said service in accordance with the sensors present in said sensor network.

The method may further comprise generating sensor controllers for said new sensors in said control element based at least on a sensor configuration repository. A generated new sensor controller may be tested automatically using a test case, and in response to a negative testing results, a manual check of the generated new sensor controller may be prompted.

The method may further comprise providing meta data describing a respective sensor for at least one of said sensors, and providing a data structure containing said meta data and said information in said common format received from the respective sensor.

It is possible to negotiate with said at least one consumer at least one of the following: quality of service, and quality of information; and to control transfer of sensor information in accordance with the negotiated quality.

Furthermore, it is possible to provide sensor configuration information of sensors connected to said control element to at least one further control element; and to provide a sensor controller to a further controller element in response to said further controller requesting said sensor controller. In response to a new sensor connected to said control element, it is possible to request whether said new sensor was previously connected to a further control element; and to request, in response to said new sensor having been previously connected to said further control element, a sensor controller and sensor configuration information from said further control element. A service directory may be updated to reflect the new sensor being connected to said control element.

At least one of the following service types may be provided: sensor information in said common format as a push service, and sensor information in said common format as a pull service. At least capabilities of separate sensors may be provided as said service.

It is possible to check authentication of service requests received from said at least one consumer on at least one of the following levels: service level and sensor level.

A second aspect of the invention provides a control element for a sensor network including a set of different sensors, said control element comprising sensor controllers for each sensor of said set of different sensors, said sensor controllers configured to
control transfer connections between said control element and said sensors,
establish transfer connections to new sensors in runtime, control said sensors, and
convert information received in a sensor-specific protocol format into a common format;

a set of common control components for processing said information in said common format; and service unit operably connected to at least one of said common control components for providing a service based on said information in said common format to at least one consumer and for updating said service in accordance with the sensors present in said sensor network.

Also a computer program product in line with the first aspect of the invention is provided.

BRIEF DESCRIPTION OF THE DRAWINGS

The above and other items, features and advantages of the invention will be better understood by reading the following more particular description of the invention in conjunction with the accompanying drawings, wherein:

FIG. 6 shows, as an example, a block diagram of sensor controllers implemented in the control element;

FIG. 7 shows, as an example, generation of a new sensor controller based on existing controllers;

Figure 1:
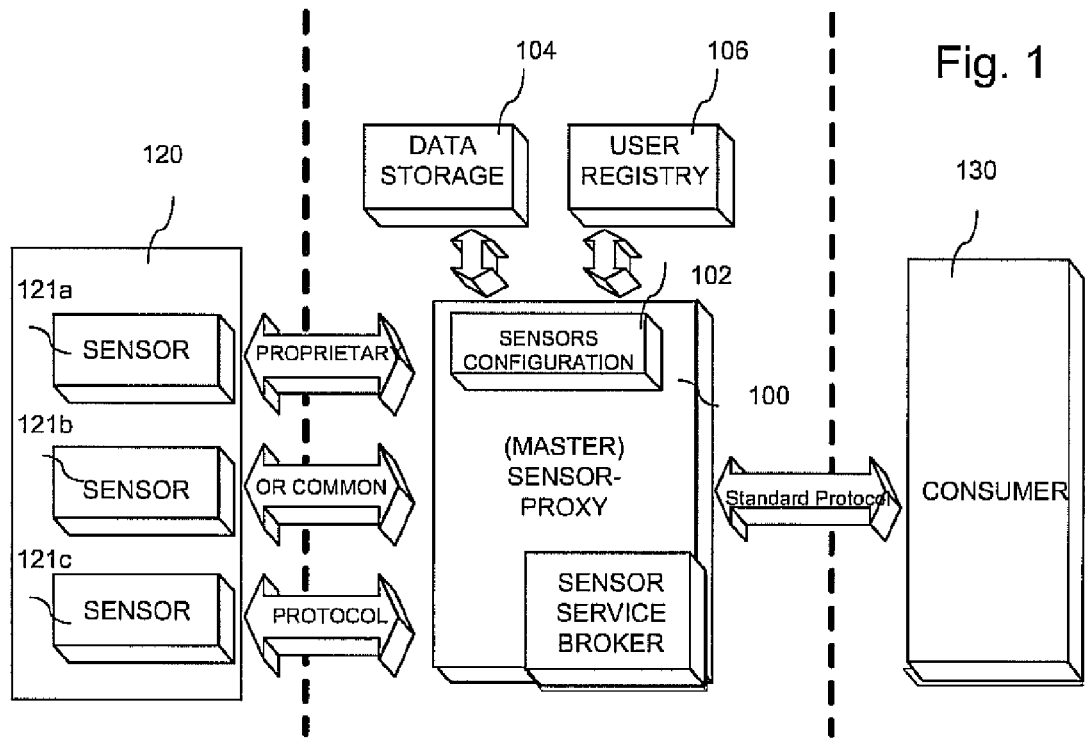
FIG. 1 shows, as an example, the general high-level architecture of a sensor network having a control element (sensor proxy) in accordance with an embodiment of the present invention.

DETAILED DESCRIPTION OF EMBODIMENTS
OF THE INVENTION

It is appreciated that in some connections the term "sensor" refers to an apparatus which transforms a physical measurement or its variation into electric signals. In these connections, the term "sensor system" typically refers to a system having one or more sensors and, additionally, one or more microprocessors that deliver the measurement results in a pre-processed format. A sensor system typically contains functionality supporting a network connection. As this description is focussed on sensor networks, all sensors are assumed to be provided with adequate functionality for pre-processing the electrical signals and for providing network connectivity. Therefore, in the following description the terms "sensor" and "sensor system" are used interchangeably.

To make sensor information usable, information systems collect and process sensor data to give a digital viewable image of the physical reality. An information system may be any data processing system on the side of a user/data consumer that at least receives, processes and/or displays sensor information. Sensors may be compliant with an industry standard or they may be legacy sensor. A sensor network may include sensors complying with plurality of different standards and/or different legacy sensors. In such a heterogeneous sensor network there are at least the following challenges to be addressed: heterogeneous variable topology, diversity of sensor system operating systems and protocols; variable, limited and uncertain transmission media; and different regulations or authorisations for accessing data provided by the sensors. Each of these challenges will be discussed next in more detail.

With respect to the heterogeneous variable topology, sensors with different operating systems, communication protocols and data processing abilities may be present in a sensor network. During operation of the sensor network, the technical kind of the binding and the total number and/or the composition of the sensors can vary. To cope with these requirements, there is need for a control element that leaves the information system using the sensor information flexible and unloaded by the connecting admission and the controlling of the communication stream. This control element should preferable offer the following possibilities: bringing in new and/or disconnection of sensors at run-time; offer as generally as possible a standard protocol and data format for the side of the information system; scalability and robustness; ability to query sensors and to check events from sensors; and persistence of configuration data of sensors and the control element itself.

With respect to the diversity of sensor operating systems and protocols, it is possible that in the foreseeable future none of the different current sensor network standardization approaches will become generally accepted. Thus different standards and the different proprietary systems of the sensor manufacturers will most probably co-exist. To cope with this fact, the control element for the sensor network should have the following abilities: ability to offer connection points for different communication protocols; ability to support bringing in new sensors into the sensor network; ability to recognize well-known sensors automatically and to make a basic recognition possible for new sensors from existing samples; and ability to convert the data received from the sensors into a generally known data format.

With respect to the transmission media, it is possible that the physical communication in sensors occurs in three variants. Firstly, durable cable-bound binding of a sensor system to the sensor network with the possible threat of a temporary connection disturbance by environmental influences. Secondly, a durable wireless connection with possible temporary interruptions is possible. Some examples of wireless connections are connection employing different radio standards, laser techniques, or infrared transmission. Thirdly, there may be need for punctual and temporary cables or wireless communications, whose binding is manufactured either manually or released automated by a trigger.

To cope with these possibilities for the transmission, the control element for the sensor network preferably have the following abilities: The control element should preferably have ability for the data storage of the transferred sensor data and the sensor configuration, without restriction on a certain data base system; The ability to reconstruct an interrupted connection to a sensor would also be useful; The control element may also have the ability to prioritize limited transmission resources within the sensor network. The control element may also be able to process an inquiry over the quality of service of the attached sensors and an inquiry over the quality of the data supplied by the sensors. Ability to plan inquiries at sensors, e.g. defining automatic inquiries at predefined time, may also be useful. The control element may also be able to steer bypassing from transmission paths. In order to make the architecture more scalable, several sensor proxies are deployable in the sensor network. In this case each sensor proxy has the responsibility for the assigned sensors. This cluster of a sensor proxy and the assigned sensors is called as a proxy domain in the following text. To enable the variable topology over proxy domains a hot swapping should be possible. Due to the potentially restricted transmission paths each sensor proxy is capable to act as the master proxy or as a slave proxy. The master will hold all addresses of sensor configuration data, that is stored in one proxy domain, but not the data itself. The control element may also publish abilities of the sensor network and abilities of the individual sensors in a directory and interchange this ability information over different sensor network clusters.

Figure 2:
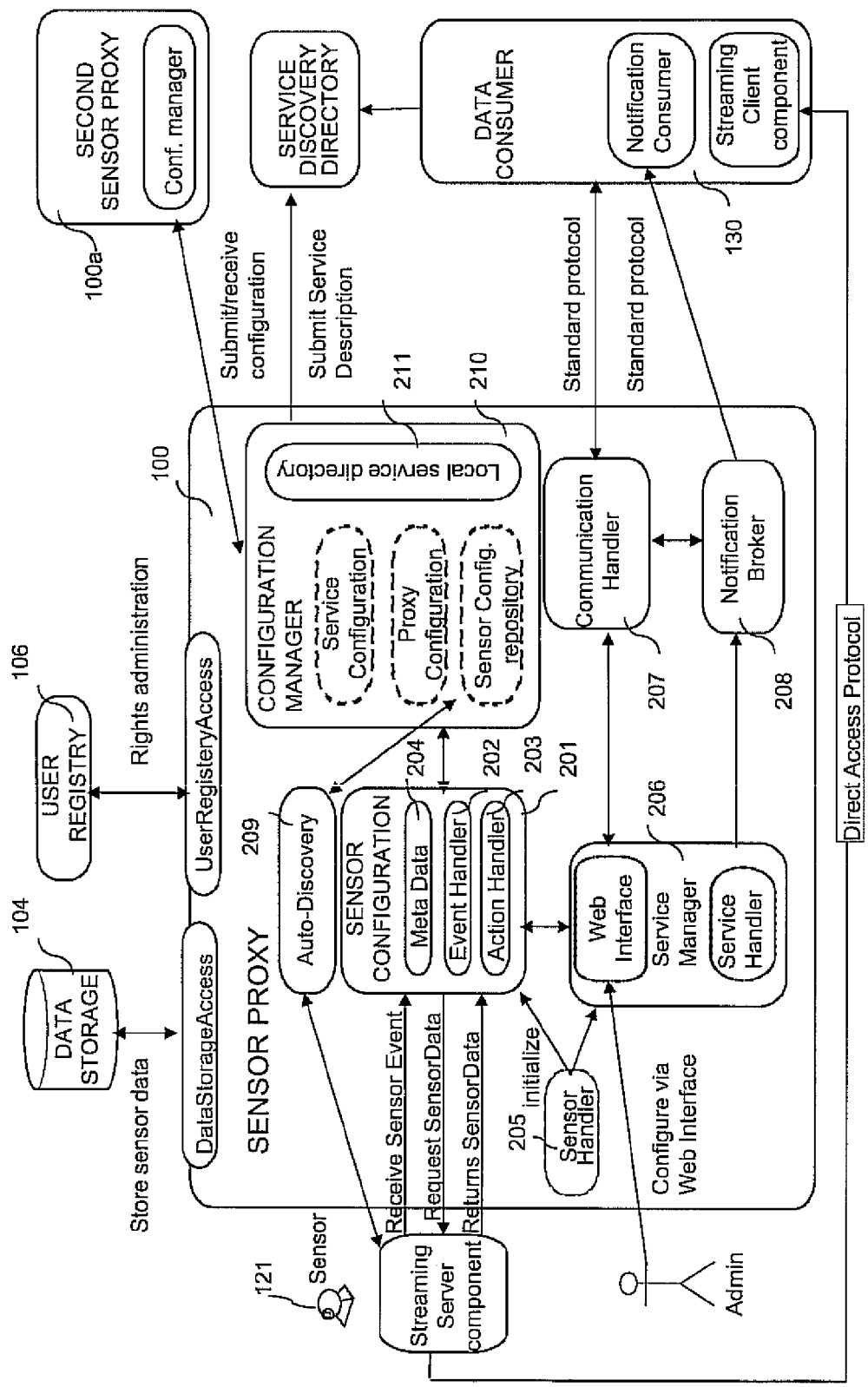
FIG. 2 shows, as an example, details of the control element shown in FIG. 1.

Each sensor is described with a common data structure which is consistent in all components of the control element and is part of the configuration description (see configuration manager 210 in FIG. 2). The data structure contains sensor information (that is, e.g., measurement results or other information sensed by the sensor) received from the sensor and metadata describing the sensor. This metadata is stored in fields of the data structure, and the metadata may include an identifier for the sensor, describe abilities of the sensor, position and structure of the sensor, a network address of the sensor, etc. The Sensor ML is an example of the format that can be used for the common data structure. The sensor may provide parts of the meta data to the control element, or the control element may infer the metadata from the information received from the sensor. Furthermore, it is possible to manually enhance the contents of the common data structure for a specific sensor. The sensor information itself (e.g., measurement results or pictures) is typically stored in the original format, for example in a binary format, within the common data structure to avoid data loss. The metadata of the sensors and the centralized registration of the sensor properties (which are stored locally within the metadata for each sensor) enable an information exchange which is necessary to provide the ability for quality of service and quality of information requests.

The concept Quality of Service (QoS) refers here to sensor-specific quality of the sensor information. QoS restrictions or capabilities can be caused by the capabilities of the sensor or the connection between the sensor and the control element. QoS means requests to support establishing and maintaining communication channels with given network requirement (such as transfer delay or bandwidth) to the sensor. Besides QoS also means the technical/physical capabilities of the sensor, which is included in the service. The concept of Quality of Information (QoI) refers here to higher level criteria, and the control element translates QoI requirements to QoS requirements. QoI means the quality of sensor information provided to the user or to a processing information system in a logical manner. The QoI gives the data consumer an ability to weight the value that the provided service has for the user's own purposes. The control element keeps track of the Quality of Service of the communication channels and the sensors, and users can request a certain sensor information quality with uncertainty thresholds. It is useful to have QoS available for an application in the domain of data consumers to rate the value of the received sensor data. QoI leverages usability of sensors, because the user gets a criterion to decide which sensor information meets best his requirements. An example for an QoS request could be to request a camera sensor to give an image with a defined resolution within a defined time. An example for an QoI request could be to request the sensor proxy to give any image of a defined area with a defined resolution within a defined time (it could be any sensor; the sensor proxy decides which sensor is the most appropriate).

With respect to the authorised access to sensor information, it is most probable that in complex sensor networks data from the sensors is not made available to anyone. Furthermore, the configuration of sensors may be reserved for determined groups of users. The control element should thus be able to perform authorisation checks of the inquiries, preferable by checking authorisation for each inquiry. The control element may support the possibility to couple the existing information management systems for authorisation administration. Additionally the security and authorisation may be available on access level. Dependent on the structure of the receiving information system a generalised authorisation of a data consumer for a specific set of inquiries can be transferred by the information system to the single inquiry. Alternatively, single inquiries can be included or excluded from the common managed access. One example is to use a LDAP to manage roles and authorisations of the data consumer and to transfer information about the roles and authorisations to the control element. The control element then can use the authorisations to enable the inquiries that are ordered by the role, in which the data consumer is represented.

Concerning security issues in the sensor domain, the control element (sensor proxy) is dependent on the manufacturer. As the sensor proxy acts as a sink within the sensor network, it needs the authorisation data for the sensor. That means: if the sensor checks the request for authorisation as well, the sensor proxy has to know this access data (e.g. the password and the identity of the requestor). Otherwise the consumer has to give this access data as a parameter within the request. Either way, the sensor proxy has to know the common security concepts.

FIG. 1 shows, as an example, the general high-level architecture of a sensor network having a control element 100 in accordance with an embodiment of the present invention. The control element 100 is also called a sensor proxy. The control element 100 does not process the content of the sensor information, but it controls the operation of the sensor network 120, provides data transmission between the sensors 121*a*, 121*b*, 121*c* and the consumer 130, and processes the format of the sensor information provided by the sensors 121. The control element 100 uses proprietary or common protocols, as adequate, in communications with the sensors 121. For communication with the consumer 130, the control element 100 uses a standard protocol, which may be, for example, a protocol used in connection with the Web Services. The control element 100 may be implemented, for example, in Java. It is preferable to establish independence from platforms.

The control element 100 includes storage for sensor data structures, which are also used as configuration information 102. As a minimum, the data structure contains the sensor identifier and typically also the position of the sensor in addition to the sensor information received from the sensor. To enable QoS negotiations, the technical specification for the sensor may be stored in the common data structure (e.g. network interface specification). For enabling QoI, the general technical specification (for example the resolution of a camera sensor) may be stored. There may also be a data storage 104 for storing data received from the sensors 121. Preferably the data storage 104 may be provided in the form of various databases. The user registry 106 is for storing information about the sensor data consumers. The authorization checking of the sensor data requests/inquiries from the consumers is based on the information stored in the user registry 106.

FIG. 2 shows, as an example, details of the control element 100 (sensor proxy) shown in FIG. 1. A sensor configuration 201 is provided in the control element 100 for each sensor of the sensor network. The sensor configuration 201 contains a piece of computer program code, which is called a sensor controller. The sensor controller contains (at least) an event handler 202 and an action handler 203. The event handler 202 accepts asynchronous messages from a sensor, whereas the action handler 203 sends synchronous requests to the sensor. The sensor configuration 201 contains meta data of the relevant sensor. Each connected sensor has its own instance of the sensor configuration; i.e. the meta data 204, the event handler 202 and action handler 203 are individual for each sensor; each sensor has its own action handler 203 and event handler 202 components in the controller element 100. The event handler 202 and the action handler 203 may need access to the meta data 204 of the common data structure. A sensor handler 205 serves as a container and regulates the lifetime cycle of all handlers 202, 203 typically for all sensors connected to the control element 100. The sensor configuration 201 could be installed inside the controller element (sensor proxy) during runtime. Preferably the sensor controllers are able to establish transfer connection to new sensors in runtime. A framework supporting runtime plug-ins is typically needed. For example, the OSGi framework can be used.

In addition, an auto-discovery component 209 and the sensor configuration repository (controller library) are relevant for the sensor controller. For each type of sensor, a logical instance of a pair event/action handler 202, 203 exists. The handler components consist of a frame of common functional processes that are responsible for the internal logic of communication flows. The specific part of each handler pair includes a set of modules for layers of the communication that may be oriented after the OSI model (see discussion in support of FIGS. 6 and 7 herein below). Each level of the model is represented in a module for the action handler and a module of the event handler. All available modules are registered in the sensor configuration library. Some specific modules can be used in combination with the action/event handler pair; for some levels and models a single representation for a specific action handler and a specific event handler is necessary depending upon the concrete implementation and the used development frameworks. There it has to be decided what is more efficient as the architecture allows both approaches.

The sensor controller is used for establishing a transfer connection between the control element 100 and the sensor 121. The transfer connection is compliant with the (standard or proprietary) protocol which the sensor 121 employs. The sensor controller processes the sensor information received in the sensor-specific protocol format into a common format. Sensor information in the common format, originally received from various sensors 121 in various formats, is processed in the control element 100 using a set of common control components. This set of common control components includes in the example shown in FIG. 2 the service manager 206, the communication handler 207, and the notification broker 208. The communication handler 207 is the entry point to the sensor network for the consumer 130. The communication handler 207 implements a standard protocol (for example, Web Services or CORBA) to accept the requests. It is possible that various communication handlers 207 are implemented in the control element 100, each communication handler supporting a different protocol. The notification broker 208 sends asynchronous messages to a consumer 130. The asynchronous messages may be, for example, events by sensors. The service manager 206 communicates via the action handlers 203 and the event handlers 202 with the sensors 121.

The control element 100 provides at least one service based on the sensor information in the common format. The service may be, for example, a directory service providing access to sensor information provided by the separate sensors. The service is provided by the service manager 206 together with the communication handler 207. The service manager 206 is responsible for the routing of the incoming requests and the outgoing data, through the components.

Since it is possible that new sensors are added to the sensor network or that some sensors are removed from the sensor network, the service manager 206 updates the service provided to the consumer in accordance with the sensors present in the sensor network. Auto discovery unit 209 adds the plug-and-play functionality. The configuration manager 210 is a container for the sensor configuration, service configuration and the sensor proxy configuration. The local service directory 211 contains definitions for all the entry points. These definitions show how a consumer could request each connected sensor (within the sensor-proxy domain) via the communication handler.

The configuration manager 210 of the control element 100 may interact with a corresponding configuration manager in a second control element 100a, if the sensor network contains more than one control element. The master-slave architecture is preferred here. The configuration manager 210 provides sensor configuration information of sensors connected to the control element 100 to the second control element 100a. Furthermore, when a sensor is moved from the control element 100 to the control element 100a, the corresponding sensor controller is moved from the control element 100 to the second control element 100a in response to the second control element 100a requesting the sensor controller. Typically, when a new sensor is connected to the second control element 100a, this second control element 100a requests from other control elements whether the new sensor was previously connected to the one of them. The other control element then, in response to the enquiry, provides the sensor controller and the sensor configuration information. Also the service directories of the control elements are updated to reflect the fact that the sensor was moved from one control element to another.

Figure 3:
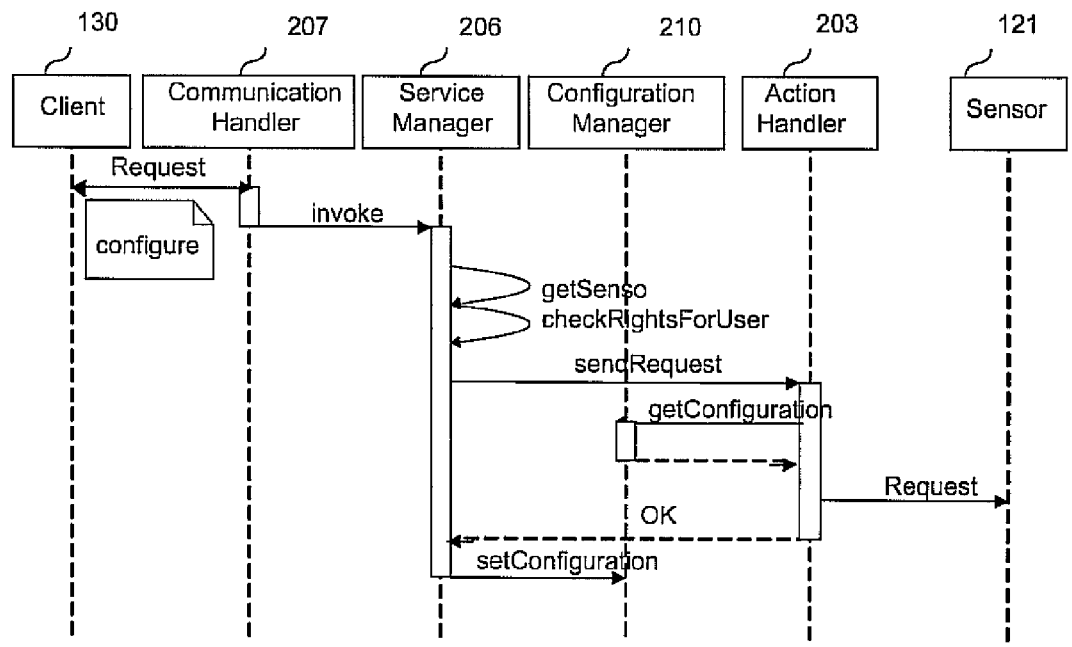
FIG. 3 shows, as an example, a message sequence chart for configuring a sensor.

FIG. 3 shows a message sequence chart of configuring a sensor via the control element (sensor proxy). The client sends a configuration request, for example via a Web service interface. The configuration request is processed using the respective sensor controller (handlers 202, 203) and some common control components, namely the service manager 206, the communication handler 207, and the configuration manager 210. The configuration request is received by the communication handler 207, which invokes the service manager 206. The service manager 206 determines which task is requested and checks whether the user requesting the configuration is authorised to carry out this task. When authorisation is appropriate, the service manager 206 sends a configuration request to the sensor handler who determines the action handler 203 of the respective sensor. The action handler 203, in turn, requests sensor configuration from the configuration manager 210, and receives the needed metadata and controller program code. The action handler 203 then sends a configuration request to the sensor 121 using the received controller code. In response the action handler 203 terminates the configuration procedure and sends an OK message to the service manager 206; the service manager 206 forwards the message to the communication handler 207 that returns this information to the requestor.

Figure 4:
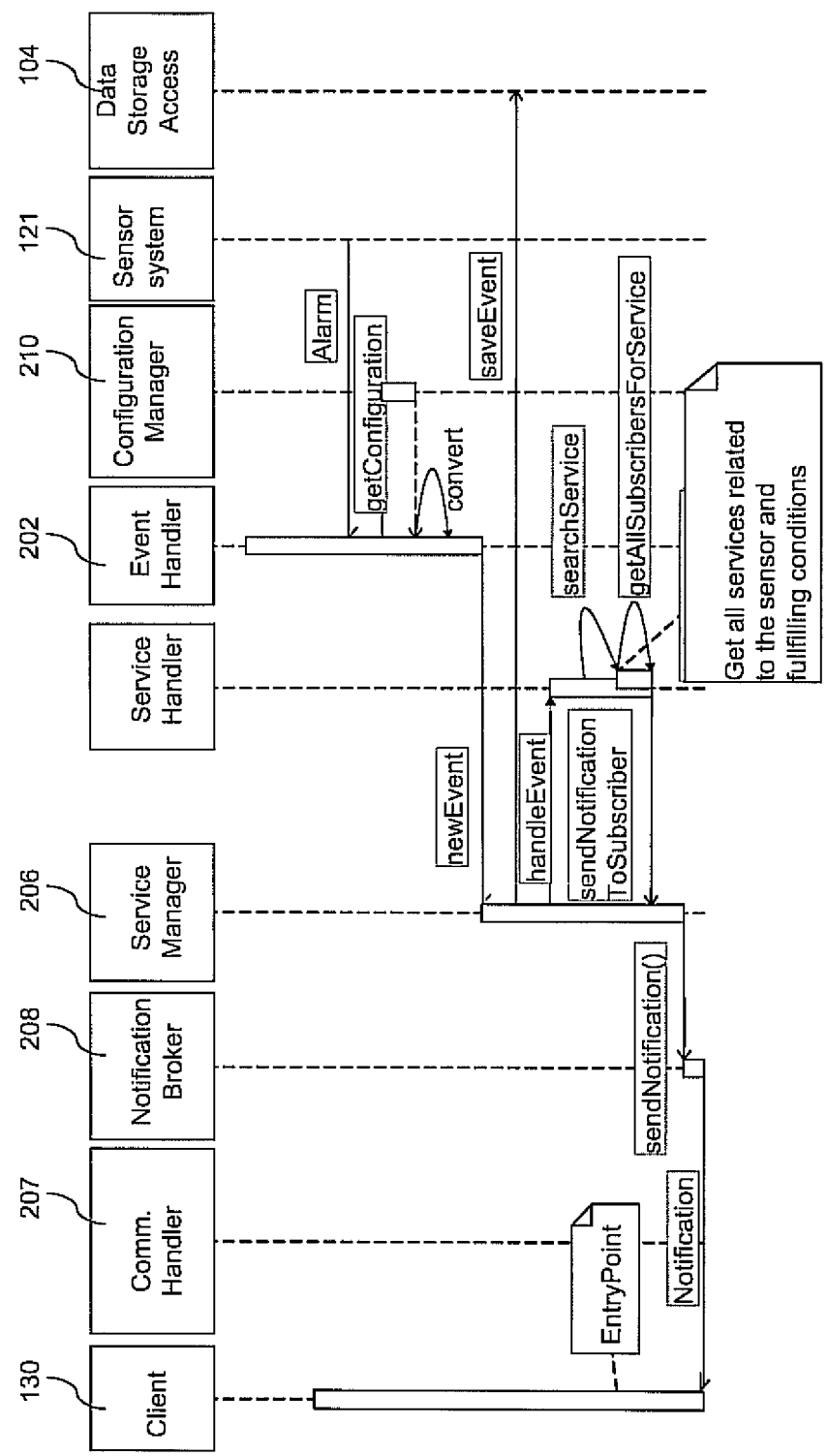
FIG. 4 shows, as an example, a message sequence chart for handling an event from a sensor.

FIG. 4 shows a message sequence chart of handling a new event (in this example, an alarm) within the control element 100. A sensor 121 in the sensor network sends an alarm, which is received by the event handler 202 of this sensor. The event handler 202 accepts these events and forwards them to the service manager 206. The distinction of the sensor is inherent within each event handler as each sensor has its own event handler 202. The event is forwarded to the service handler which finds all the users who subscribed for this event or for a service associated with this event and forwards the notification together with the user list to the notification broker 208. Finally the notification broker 208 distributes the event to all these users.

Figure 5:
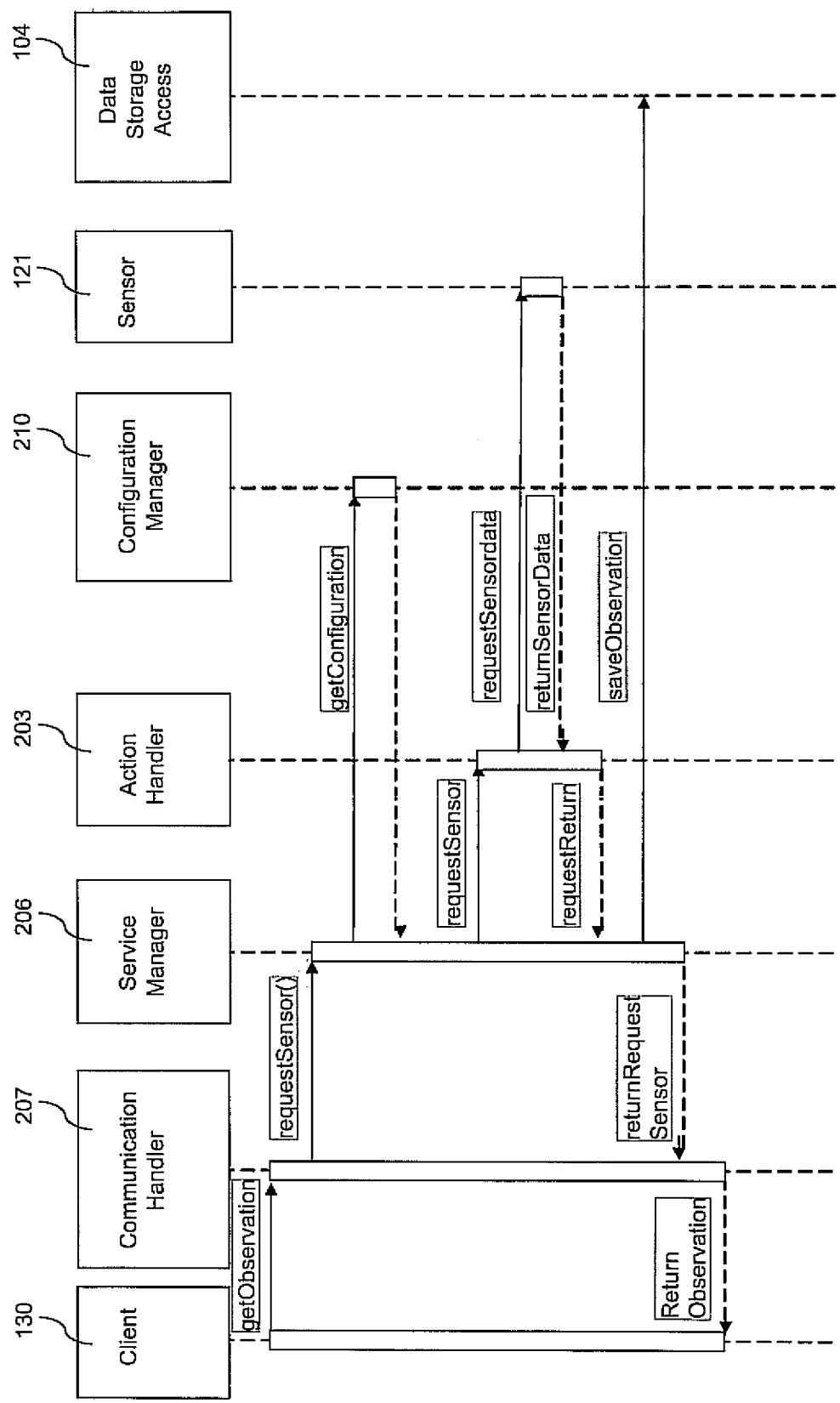
FIG. 5 shows, as an example, a message sequence chart for requesting sensor information.

FIG. 5 shows a message sequence chart of handling a sensor request sent by a consumer 130 in the control element 100. The communication handler 207 sends the message to the service manager 206, where typically an authorization check is done. If the authorisation check is positive, the request is forwarded to the sensor handler 201, which uses the dedicated action handler 203 to request sensor information from this sensor 121. The sensor information in response to this request is returned from the sensor 121 to the action handler 203. The action handler 203 sends the sensor information to the service manager 206 who stores the sensor data in the data storage 104. The service manager 206 then forwards the sensor information to the communication handler 207. The sensor information is transmitted to the requestor 130.

FIGS. 6 and 7 show, respectively, the structure of sensor controllers implemented in the control element 100 and how the existing controllers or a sensor configuration repository (controller library) 710 can be used as a basis for generating a new sensor controller 701. An event handler 202 and an action handler 203 of a sensor controller in FIG. 6 is built from a number of modules. The modules are included in a container that provides ability to differentiate/cooperate between several layers of communication. These containers with the included modules represent the specific action/event handler pair, that is the working processing part of the controller. Each module is responsible for one layer. The modules can be in accordance with the Open System Interconnection (OSI) model. As shown in FIG. 6, modules of the layers 3-5 of the OSI model may be in accordance with the IEEE 1451.1 standard. The module of the layer 7 may be in accordance with the Sensor ML specification. The capabilities of a controller are oriented to the potential variances in sensor networks. If a connection changes for example from a TCP/IP protocol to a socket, but the semantic structure of the sensor data is the same, only the modules for the transport layers have to be changed.

FIG. 7 shows sensor controllers A, B, C and D which may be either part of a sensor configuration repository or other existing sensor controllers in a control element 100, which are also registered in the repository. A new controller for a new sensor may be generated based on the controllers A to D by combining modules from the controllers. As described above the container provides a framework, how the modules are differentiated and work together. Each module can be replaced by another kind of specific controller module, if physically/logically possible. The container checks the compatibility between modules on separate ongoing layers. This combination work is done by the auto-discovery component 209. The repository has an internal structure that allows to rank or prioritize the included modules and event/action handler pairs.

Figure 8A:
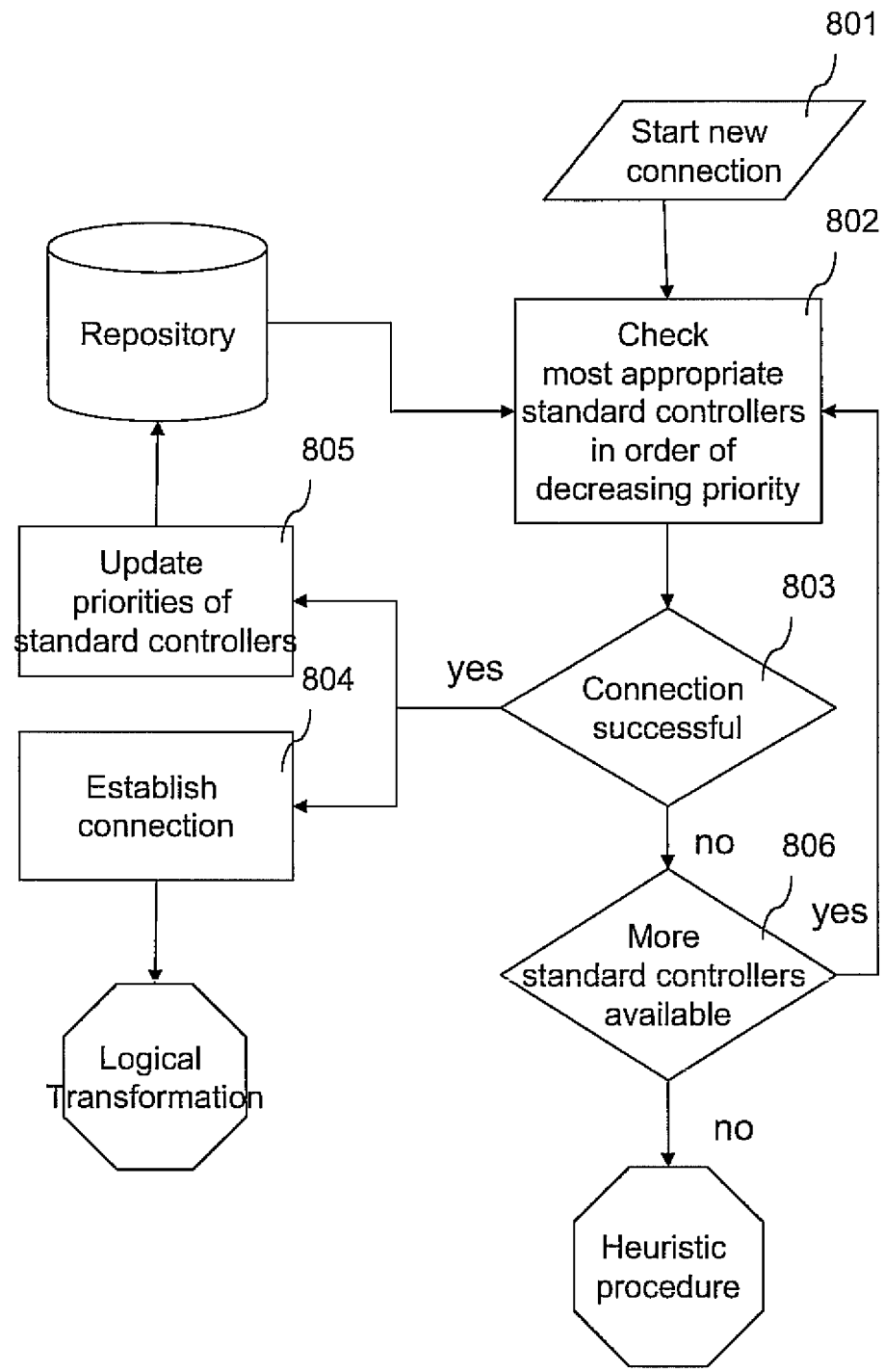
FIGS. 8a to 8d show a flowchart of a method for building a connection from the control element to a new sensor.

FIGS. 8a to 8d show a flowchart of a method for building a connection from the control element to a new sensor. Referring first to FIG. 8a, where the method starts in step 801 in response to detecting a new sensor connected to the control element. The control element 100 first checks (steps 802, 806) the most used controllers in a decreasing order of priority, to see if any one of the most used controllers fits the requirements. If a trial connection can be established successfully (step 803), the suitable controller will be used to establish a connection (step 804) and the priority of the found controller is increased (step 805) inside the sensor configuration repository. The method continues after step 804 in FIG. 8d at the position indicated by the "Logical Transformation" connector. If a trial connection cannot be successfully established using the most used controllers, the control element proceeds to a heuristic procedure from step 806. The heuristic search is performed in step 807 in FIG. 8b to find similarities between the new sensor and available controllers. The similarities here refer to similarities of an established physical level connection to the new sensor with physical levels of earlier connections. Again, if the search is successful and a trial connection can be established successfully (step 808), a connection to the sensor is established in step 804 and the priority of the found controller is increased in step 805. It is assumed that in case of a heuristic search, the found combination of modules may not allow a connection that includes a semantic and logical transformation of the sensor data to the internal data structure of the control element. If a connection is established, the control element will perform a number of test cases, that are composed from the available operations of the control element (e.g. sending and receiving data on each connected layer). The results will be saved in a log.

Figure 8B:
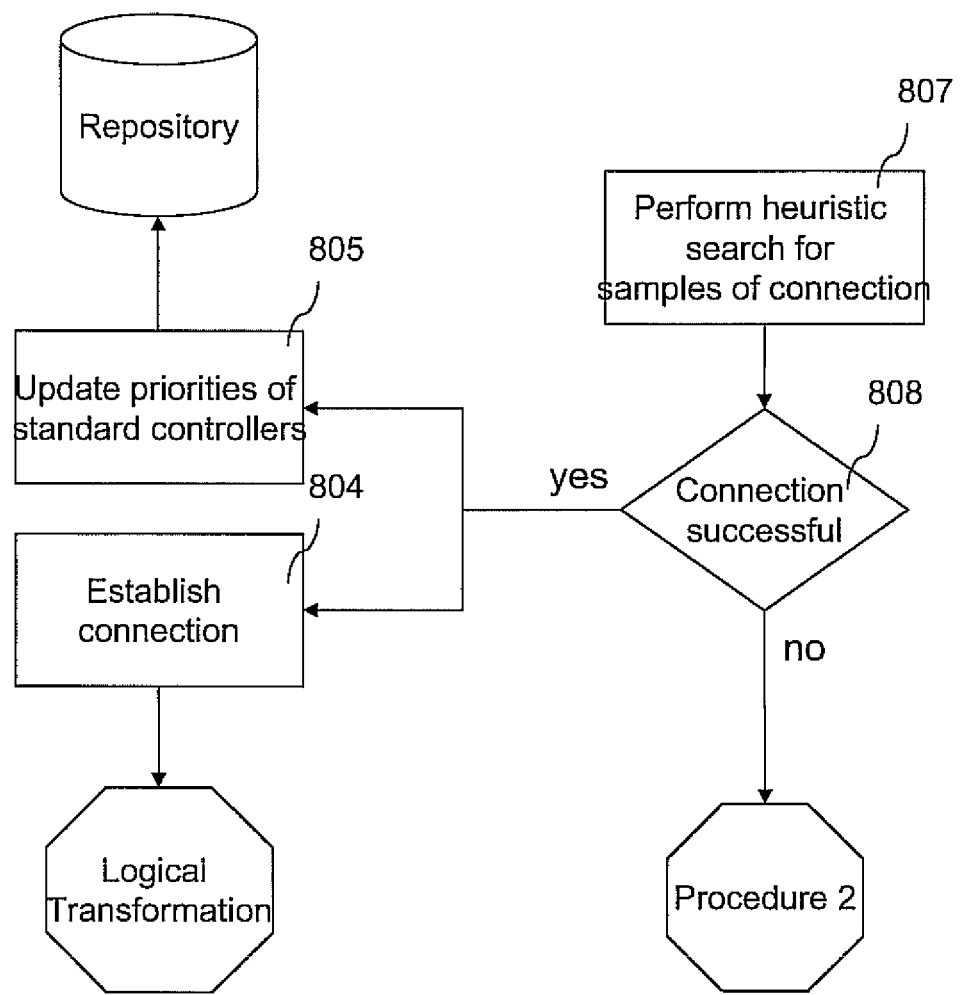
Figure 8C:
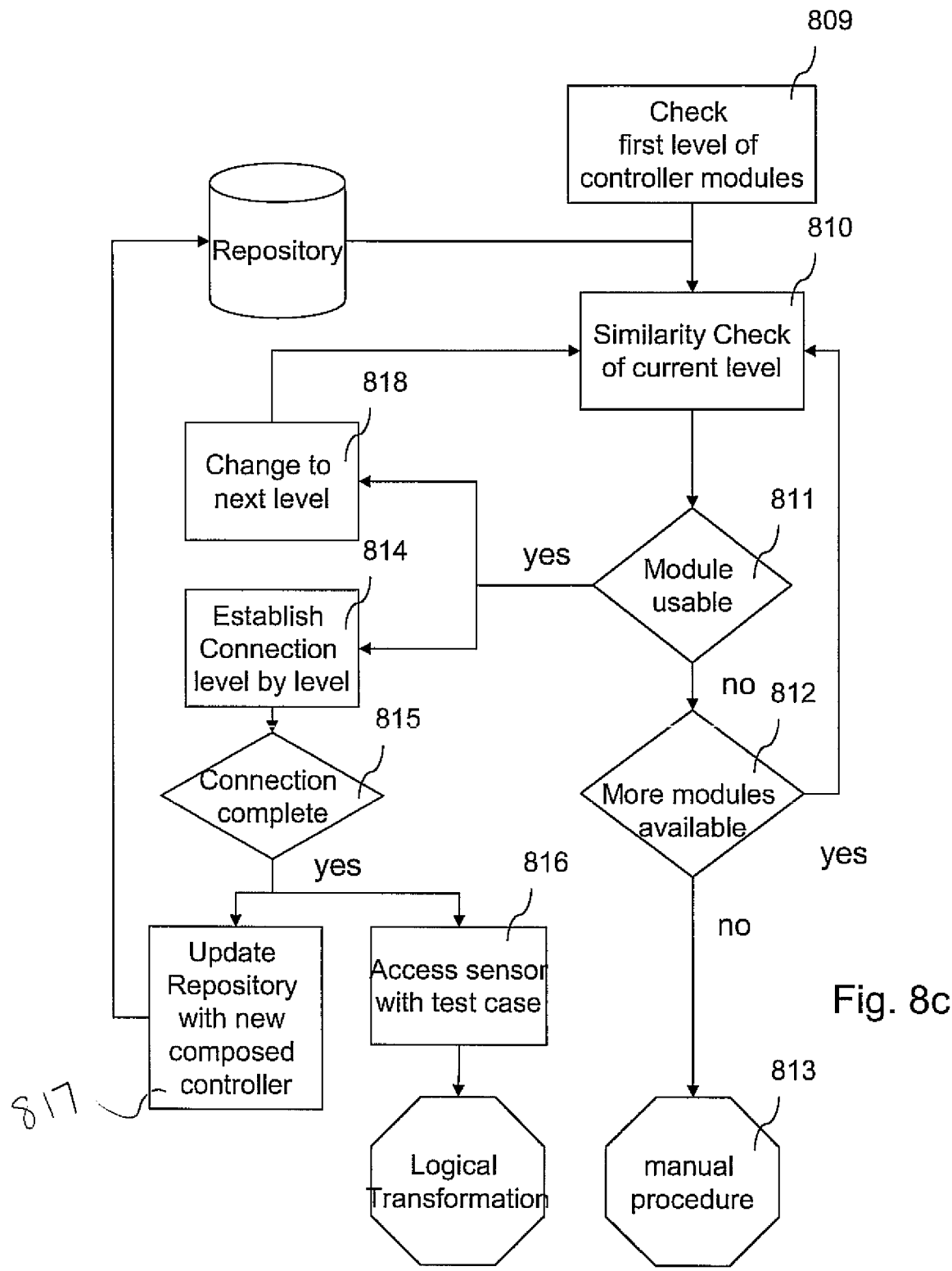

If the heuristic search in FIG. 8b is not successful, the control element performs a full search (steps 810-812 in FIG. 8c) on all available controller modules layer by layer, beginning on the first layer (step 809). If a module is found to establish physical transport of bits (layer 1) the results are tested versus a test case specific for layer 1 (step 816). If connection or test case are not successful, the module has to be established manually (step 813). If a trial connection can be successfully implemented (step 811), the search increases one layer (step 818) and the trial connection is established level by level (steps 814, 815). Any found or new developed module will be inserted in the repository (step 817). Information about how the modules interact with the modules in the adjacent layer is stored in the repository.

Figure 8D:
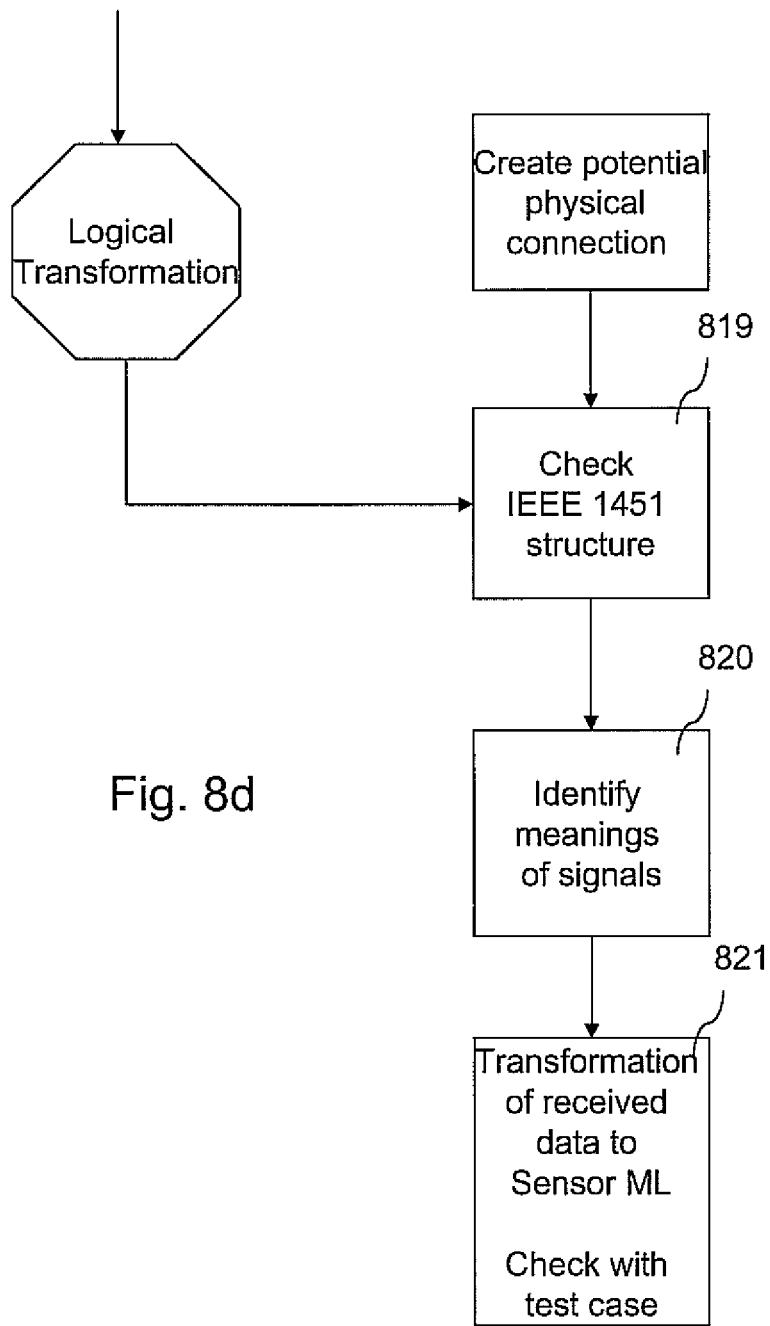

On the higher levels, the IEEE 1451.1 structure is used to identify similarities (see step 819 in FIG. 8d). If there is no complete identical module appropriate, this procedure checks field by field the IEEE 1451.1 structure with the sensor (step 820) and gives a result in a log file if an identity is found or not. The so built new modules are presented and completed manually. The logical transformation of the Sensor Data to Sensor ML (step 821) is typically done in an editor where the user will have to declare field by field the meanings in the Sensor ML structure. After the completion of generation of the controller modules, specific test cases are performed (step 821) to check if the modules fulfill the requirements. In response to negative testing results, the control element may prompt an administrator to do a manual check of the generated new sensor controller. Each successful module itself and the structure of the complete controller are added to the repository, including information about the action/event handler pairs.

Figure 9:
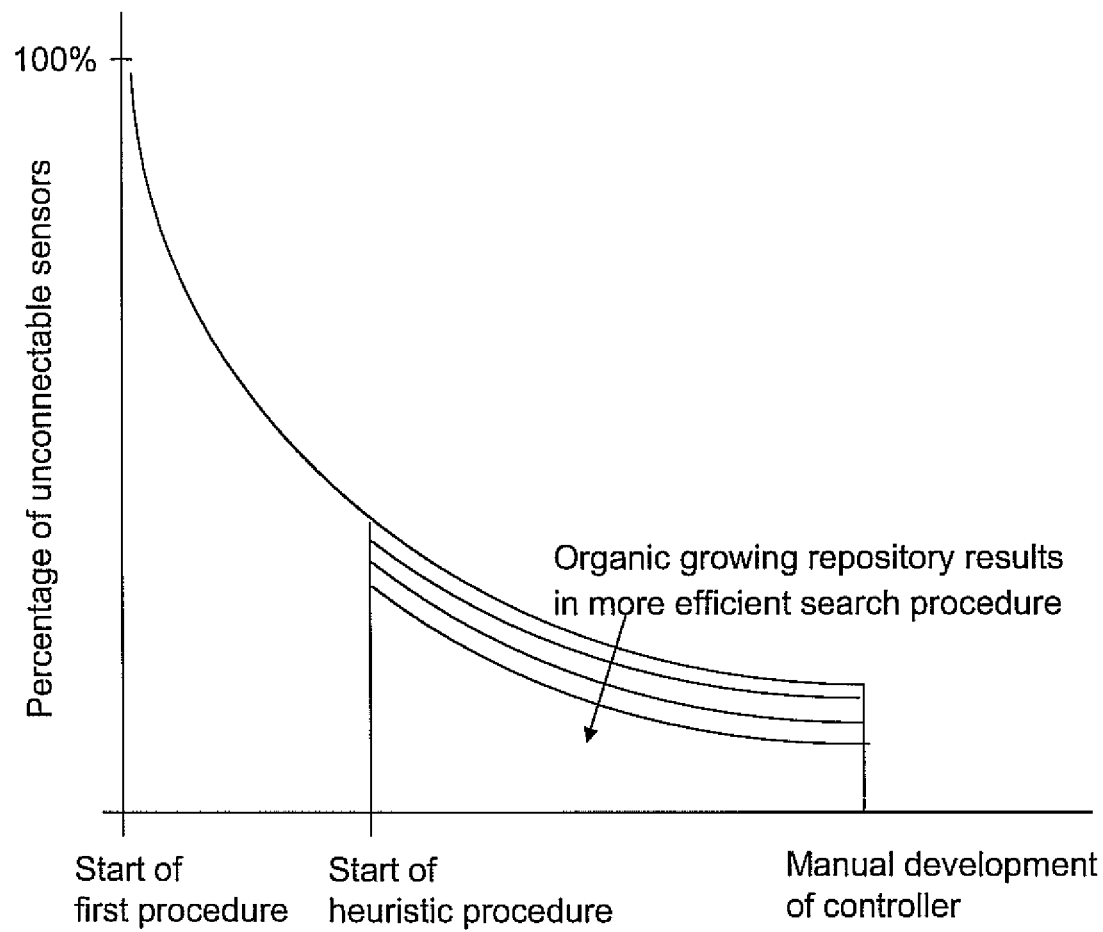
FIG. 9 shows a graph illustrating the effect of a growing controller container.

This method of generating sensor controllers by combining and modifying modules stored in a controller repository leads to an organic growing controller library, which reduces potential manual effort, as shown in FIG. 9. The method may be combined with prior art auto-discovery capabilities (e.g., network sniffer etc.) to decrease the manual effort.

Figure 10:
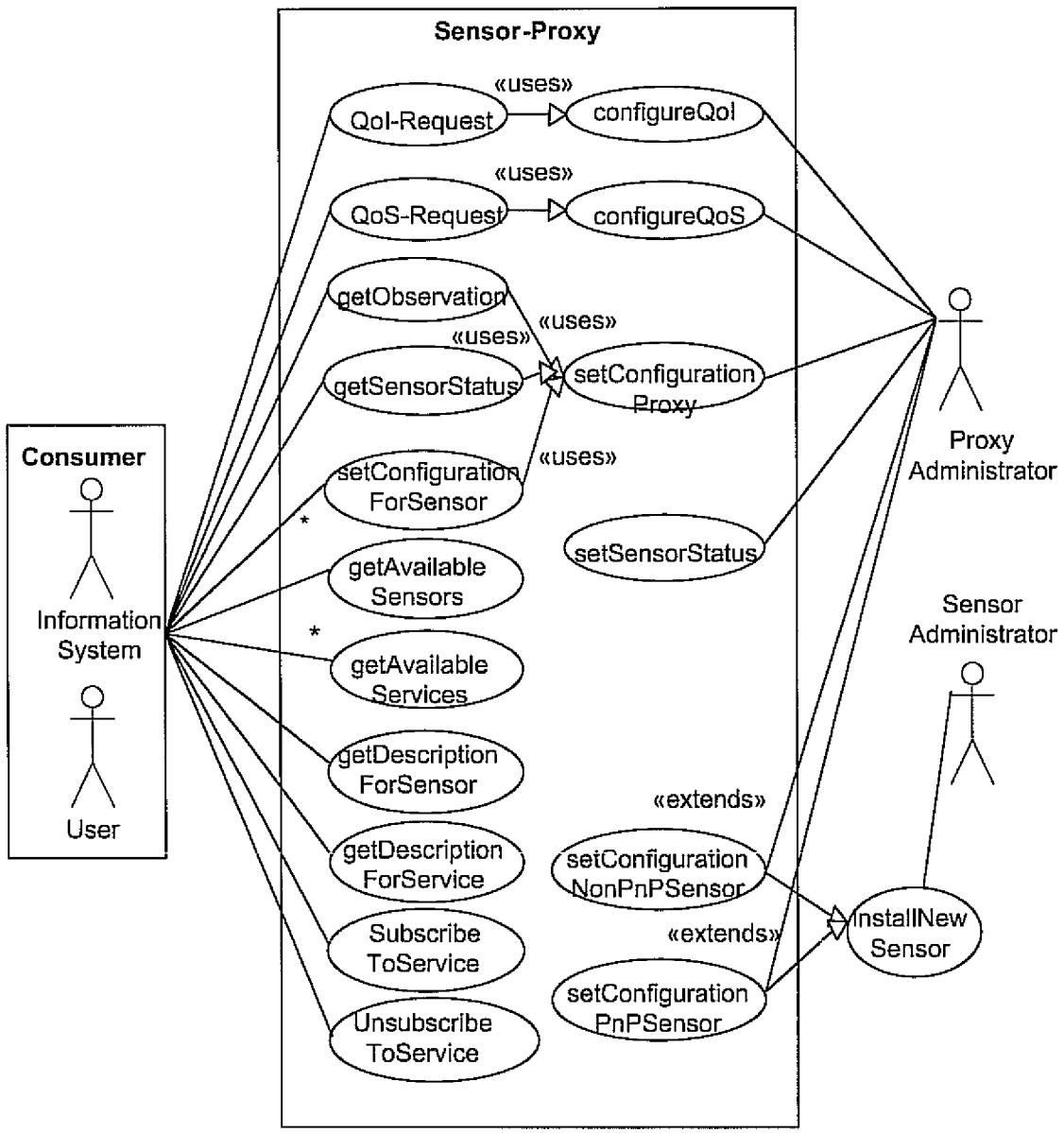
FIG. 10 shows, as an example, various functionalities supported by the control element in FIG. 1.

FIG. 10 shows, as an example, a set of functionalities implemented within the control element and the logical dependencies of the functionalities. The names of the used transactions follow the denomination that is used in the above description. FIG. 10 shows three kinds of users: the consumer, the proxy administrator and the sensor administrator. The consumer is an entity, which wants to obtain sensor data (e.g. an information system or a simple display). The proxy administrator is a person, who sets the configuration for the sensor proxy, adds functionality to the proxy (often a programmer who uses the interfaces provided by the sensor proxy e.g. enhancing the parameters for a QoS request) and can set the state of one sensor. The sensor administrator is a person who manually reworks the pre-defined and automatically obtained configuration of the sensors.

Figure 11:
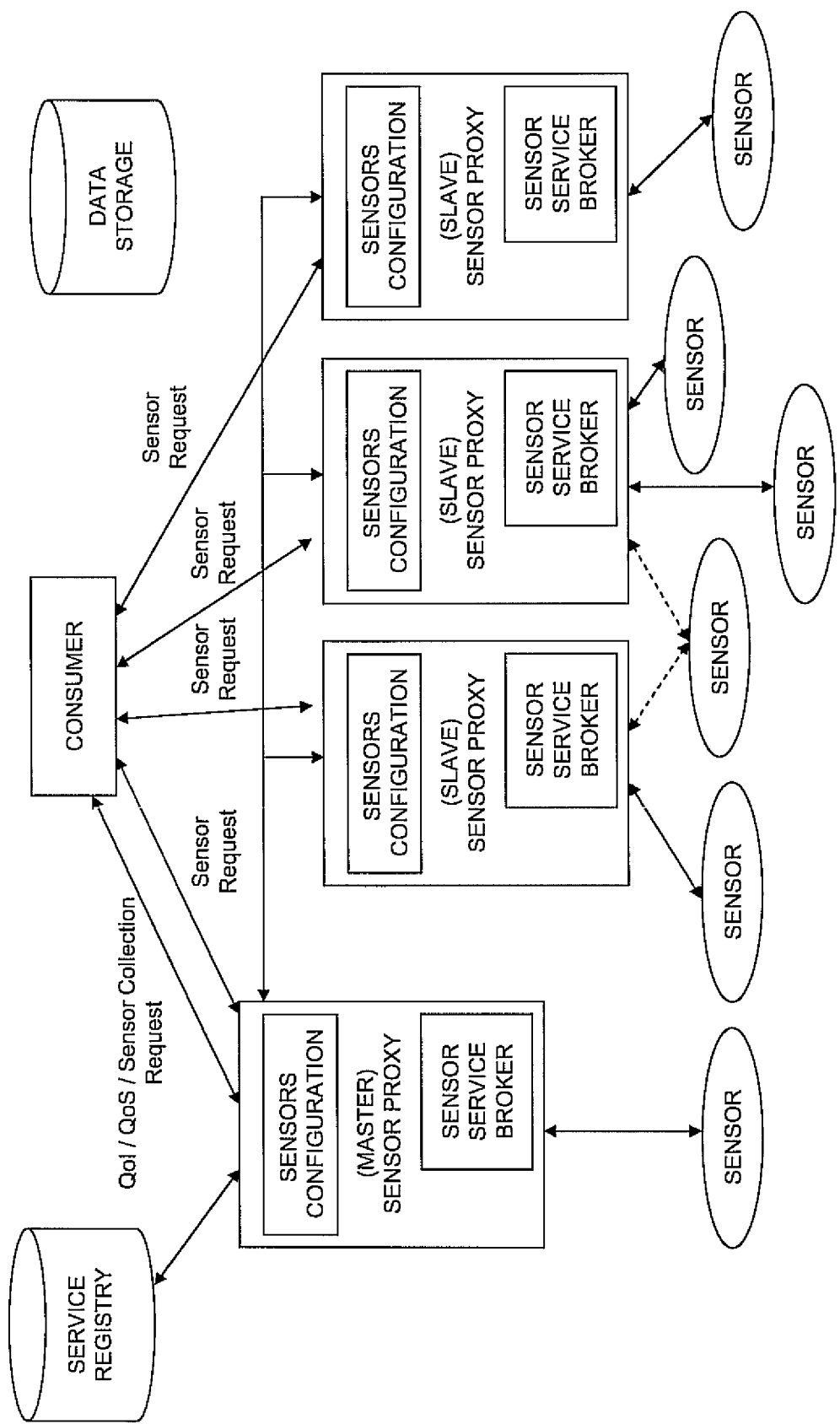
FIG. 11 shows, as an example, a scalable architecture for handling a larger amount of sensors.

FIG. 11 shows how several sensor proxies can be used to achieve high scalability. If only one sensor proxy is used within the sensor network, this one sensor proxy is the master. If there are several sensor proxies, one serves as the master, the other are the slaves. QoS and QoI requests are transmitted to the master, only direct sensor requests are addressed to the slave sensor proxies. Each sensor proxy can act as a master or the slave. The master holds the configuration of all the sensors within the network. Each slave sensor proxy holds only the configuration of the sensors of its own domain. When a sensor is hot-swapped from one sensor proxy domain to another, first the configuration on the new sensor proxy is updated and then the new sensor proxy pushes the configuration to the master sensor proxy. Finally the master sensor proxy updates the configuration on the old sensor proxy. The master also updates the service registry to enable users to dynamically find a sensor.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

This description explicitly describes some combinations of the various features discussed herein. It is appreciated that various other combinations are evident to a skilled person studying this description.

In the appended claims a computerized method refers to a method whose steps are performed by a computing system containing a suitable combination of one or more processors, memory means and storage means. The control element refers to any data processing system, implemented in an appropriate combination of hardware and software, having the functionality specified in the appended claims.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method for dynamically configuring a sensor network, the method comprising:
   connecting a first sensor to a first control element in said sensor network;
   providing a sensor configuration information of said first sensor connected to said first control element to a second control element in said sensor network;
   disconnecting said first sensor from said first control element;
   connecting said first sensor to said second control element;
   generating a sensor controller corresponding to said first sensor, the generating said sensor controller including:
      providing a sensor configuration repository that includes existing sensor controllers;
      evaluating compatibility of modules of existing sensor controllers; and
      combining the compatible modules of said existing sensor controllers, the combined compatible modules becoming said generated sensor controller;
   requesting, by said second control element, the generated sensor controller associated with said first sensor;
   transferring said generated sensor controller to said second control element in response to said request;
   receiving, at said generated sensor controller of the said first sensor, messages from other sensors in said sensor network, the receiving the messages by said generated sensor controller asynchronized with receiving messages by other sensor controllers; and sending, by said generated sensor controller of said first sensor, requests to other sensors in said sensor network, the sending the requests by said generated sensor controller synchronized with sending requests by said other sensor controllers.

2. The method according to claim 1, further comprising:
connecting a new sensor to said second control element;
querying, by said second control element, whether said new sensor was previously connected to other control elements;
determining, by said other control elements, whether said new sensor was previously connected to said other control elements; and
providing, from one of said other control elements to said second control element, a sensor controller and sensor configuration information of said new sensor in response to determining that said new sensor was previously connected to said one of said other control elements.

3. The method according to claim 2, further comprising:
updating at least one service directory of said first and second control elements in order to record a transfer of said first sensor from said first control element to said second control element.

4. The method according to claim 1, wherein said first control element performs steps of:
controlling an operation of said sensor network;
providing data transmission between sensors and consumers; and
processing a format of sensor information provided by said sensors.

5. The method according to claim 4, wherein said sensor configuration information includes: a sensor identifier of said first sensor, a position of said first sensor in said sensor network, and said sensor information from said first sensor.

6. The method according to claim 5, wherein said sensor controller performs steps of:
establishing a connection between said first control element and said first sensor;
receiving said sensor information in a sensor-specific format;
converting said received sensor information from said sensor-specific format to a common format;
processing said converted sensor information.

7. A system for dynamically configuring a sensor network, the system comprising:
a first control element controlling an operation of said sensor network;
a first sensor establishing a communication with a first control element;
said first control element providing a sensor configuration information of said first sensor to a second control element in said sensor network;
said first control element disconnecting said communication with said first sensor;
said second control element establishing a communication with said first sensor;
said first control element generating a sensor controller corresponding to said first sensor, the generating said sensor controller including:
providing a sensor configuration repository that includes existing sensor controllers;
evaluating compatibility of modules of existing sensor controllers; and
combining the compatible modules of said existing sensor controllers, the combined compatible modules becoming said generated sensor controller;
said second control element requesting the generated sensor controller associated with said first sensor;
said first control element transferring said generated sensor controller to said second control element in response to said request;
said generated sensor controller of the said first sensor receiving messages from other sensors in said sensor network, the receiving the messages by said generated sensor controller asynchronized with receiving messages by other sensor controllers; and
said generated sensor controller of said first sensor sending requests to other sensors in said sensor network, the sending the requests by said generated sensor controller synchronized with sending requests by said other sensor controllers.

8. The system according to claim 7, further comprising:
said second control element establishing a communication with a new sensor and querying whether said new sensor previously established the communication with other control elements;
said other control elements determining whether said new sensor previously established the communication with other control elements; and
one of said other control elements providing a sensor controller and sensor configuration information of said new sensor to said second control element in response to determining that said new sensor previously established the communication with said one of said other control elements.

9. The system according to claim 7, wherein said first and second control elements update at least one service directory in order to record the transfer of said first sensor from said first control element to said second control element.

10. The system according to claim 7, wherein said first control provides data transmission between sensors and consumers and processes a format of sensor information provided by said sensors.

11. The system according to claim 10, wherein said sensor configuration information includes: a sensor identifier of said first sensor, a position of said first sensor in said sensor network, and said sensor information from said first sensor.

12. The system according to claim 11, wherein said sensor controller receives said sensor information in a sensor-specific format, converts said received sensor information from said sensor-specific format to a common format, and processes said converted sensor information.

13. A computer program product for dynamically configuring a sensor network, the computer program product comprising a non-transitory storage medium readable by a processing circuit and storing instructions run by the processing circuit for performing a method, said method steps comprising:
connecting a first sensor to a first control element in said sensor network;
providing a sensor configuration information of said first sensor connected to said first control element to a second control element in said sensor network;
disconnecting said first sensor from said first control element;
connecting said first sensor to said second control element;
generating a sensor controller corresponding to said first sensor, the generating said sensor controller including:
providing a sensor configuration repository that includes existing sensor controllers;

evaluating compatibility of modules of existing sensor controllers; and combining the compatible modules of said existing sensor controllers, the combined compatible modules becoming said generated sensor controller;

requesting, by said second control element, the generated sensor controller associated with said first sensor;

transferring said generated sensor controller to said second control element in response to said request;

receiving, at said generated sensor controller of the said first sensor, messages from other sensors in said sensor network, the receiving the messages by said generated sensor controller asynchronized with receiving messages by other sensor controllers; and sending, by said generated sensor controller of said first sensor, requests to other sensors in said sensor network, the sending the requests by said generated sensor controller synchronized with sending requests by said other sensor controllers.

14. The computer program product according to claim 13, further comprising:

connecting a new sensor to said second control element;

querying, by said second control element, whether said new sensor was previously connected to other control elements;

determining, by said other control elements, whether said new sensor was previously connected to said other control elements; and providing, from one of said other control elements to said second control element, a sensor controller and sensor configuration information of said new sensor in response to determining that said new sensor was previously connected to said one of said other control elements.

15. The computer program product according to claim 14, further comprising:

updating at least one service directory of said first and second control elements in order to record a transfer of said first sensor from said first control element to said second control element.

16. The computer program product according to claim 15, wherein said first control element performs steps of:

controlling an operation of said sensor network;

providing data transmission between sensors and consumers; and processing a format of sensor information provided by said sensors.

17. The computer program product according to claim 16, wherein said sensor configuration information includes: a sensor identifier of said first sensor, a position of said first sensor in said sensor network, and said sensor information from said first sensor.

18. The computer program product according to claim 17, wherein said sensor controller performs steps of:

establishing a connection between said first control element and said first sensor;

receiving said sensor information in a sensor-specific format;

converting said received sensor information from said sensor-specific format to a common format;

processing said converted sensor information.

* * * * *